(12) United States Patent
Langer et al.

(10) Patent No.: US 6,373,898 B1
(45) Date of Patent: Apr. 16, 2002

(54) HIGH-SPEED START CODE SCANNER FOR MPEG-2 DATA STREAMS

(75) Inventors: Randy Langer, Port Orchard, WA (US); Robert M. Wolff, Fremont, CA (US)

(73) Assignee: Ravisent Technologies, Inc., Malvern, PA (US)

( * ) Notice: Subject to any disclaimer, the term of this patent is extended or adjusted under 35 U.S.C. 154(b) by 0 days.

(21) Appl. No.: 09/287,535

(22) Filed: Apr. 6, 1999

(51) Int. Cl.[7] ................................. H04N 7/12
(52) U.S. Cl. ..................... 375/240.23; 375/240.29; 375/240.26
(58) Field of Search .............. 375/240.23, 240.26, 375/240.29, 246, 253, 369; 341/67; 712/208, 213, 300

(56) References Cited

U.S. PATENT DOCUMENTS

| | | | | |
|---|---|---|---|---|
| 5,727,036 A | * | 3/1998 | Maertens | 375/369 |
| 5,734,429 A | * | 3/1998 | Jung | 348/390 |
| 5,821,886 A | * | 10/1998 | Son | 341/67 |
| 5,828,426 A | * | 10/1998 | Yu | 348/845.3 |
| 6,185,339 B1 | * | 2/2001 | Ozaki | 382/232 |

FOREIGN PATENT DOCUMENTS

| | | | | | |
|---|---|---|---|---|---|
| JP | 409093574 A | * | 4/1997 | ............ | H04N/7/24 |
| JP | 410210442 A | * | 8/1998 | ........... | H04N/7/167 |

OTHER PUBLICATIONS

MPEG–2: *The basics of how it works*, Unknown.

* cited by examiner

Primary Examiner—Vu Le
(74) *Attorney, Agent, or Firm*—Michael A. Glenn (57) ABSTRACT

A word wise search is performed on an MPEG-2 stream. For every word, the invention finds word-aligned patterns of 0x00 0x00 or 0x00 0x01. The algorithm applied by the invention examines the input stream buffer for the first word aligned 0 in which further testing determines is the first byte of a valid start code, and sets the sub-buffer defined by the start of the search to the location of this discovered start-code as the zero-word reach. A second search is performed in the same part of the input stream buffer, this time looking for word aligned 1's (i.e. byte pattern 0x00 0x01). For each word aligned 1 that is a start code, an entry is made into a start code list. When all of these have been found, the offset of the start code ending the current zero-word reach is added to the list of start-code offsets. This process is repeated from the 0 word reach until the end of the buffer is encountered. If 0's are not word aligned, the start codes are found on the 1's search, otherwise the start codes are found on the first search.

22 Claims, 7 Drawing Sheets

HIGH-SPEED START CODE SCANNER FOR MPEG-2 DATA STREAMS

BACKGROUND OF THE INVENTION

1. Technical Field

The invention relates to a multi-byte search, for example to locate a pattern in streaming data. More particularly, the invention relates to a high-speed mechanism for scanning a real-time stream of data to locate a start-code-prefix in an MPEG-2 data stream, and streams that use the exact same start-code paradigm. The same general algorithm can be applied to search patterns of any byte length, and is especially useful in cases where the length of the search pattern is an odd number of bytes.

2. Description of the Prior Art

The MPEG-2 standard is often used for the formatting and transmission of audio and video information (for more information on the MPEG-2 standard, see http://www.mpeg.org). Due to the widespread use of the MPEG-2 standard, it has been desirable to implement a high-speed mechanism for scanning a real-time (i.e. no flow control) stream of MPEG-2 data to locate start code prefixes (i.e. byte patterns that delimit the structural components or packets which constitute the data stream). This is necessary because the data in such stream are passed to a system for processing in real time. Accordingly, each elementary unit of the stream must be reliably identified in real time for such unit to be parsed into its constituent parts and processed at a rate commensurate with the incoming data rate. Such start code prefix scanning typically represents a very significant portion of the overall CPU use in MPEG-2 processing programs, in some cases exceeding 50% of CPU use.

In the MPEG-2 standard (see ISO/IEC 13818-1:1996(E) Table 2–17 and ISO/IEC 13818-1:1996(E), Tables 2–2, 2–6, 2–25, 2–27, and 2–28), a start-code-prefix is represented by the 8-bit-aligned byte pattern 0x00 0x00 0x01, with the following additional constraints:

If the three bytes following the 0x00 0x00 0x01 pattern are all 0x00, it is not a valid start code and should be so rejected by the scanner.

For an audio packetized elementary stream (PES), the only valid values for the byte following the 0x00 0x00 0x01 pattern lie in the range 0xC0 through 0xDF, inclusive. For video, the reverse is true: if the byte following the 0x00 0x00 0x01 pattern in a video stream lies in the range of 0xC0 through 0xDF, inclusive, it is not a valid start code, and the scanner must reject it.

Because some present MPEG-2 implementations use MPEG-1 format in their audio PES streams, it is possible for a seemingly valid start code to appear in the payload because it is not illegal for an MPEG-1 audio stream to contain 0x00 0x00 0x01 as part of its compressed payload. The next few bytes following the start code pattern can be examined to validate further the presence of a real start code, but there is no guaranteed algorithm to insure that audio start code synchronization is maintained during scanner operation on an MPEG-1-conforming audio channel. This problem does not exist for conformant MPEG-2 video and audio channels. In fact, it is guaranteed in the MPEG-2 specification that this can never occur.

There are two approaches that have been used in the art to address the issue of MPEG-2 start code scanning:

A serial read of the incoming bytes looking for a 0x00 0x00 0x01 pattern. This approach is processor intensive.

Reading the MPEG-2 data into a buffer, and then examining every third byte to see if it is a 0x00 or 0x01. When either value is found, the neighboring bytes are examined to see if they constitute a 0x00 0x00 0x01 pattern. This byte-wide search is also processor intensive, although considerably less so than the first approach.

Neither above cited approach is particularly efficient because a significant amount of processor time is expended not only in looking for a target byte value(s), but in further qualifying the neighboring bytes to determine if a complete start code has been discovered. The first technique cited above can be coded in assembly language for processors having so called string instructions, such as the Intel 8×86/Pentium family, and achieve a performance boost.

Nonetheless, it would be advantageous to provide an algorithm that is more efficient than either of the two above-cited techniques, even when they are coded in assembly language.

SUMMARY OF THE INVENTION

In the preferred embodiment of the invention, a word-wise search is performed. Such strategy requires the same number of clock cycles as a byte-wide search, but involves one-half as many addresses, thereby cutting execution time in half. For every start code, either the first or second byte is on a word boundary, so that by searching the data twice, first for the 0x00 0x00 word, then again for the 0x00 0x01 word, every start code in the data can be found (each successful search "hit" requires an examination of the neighboring bytes to insure that it is really a start-code, but the rules are simple and can be coded efficiently). There are normally no wait states in the second search because the second search will be executed out of the machine's data cache (if it has one).

The invention provides an algorithm that is more efficient at start code scanning than either of the two above-cited techniques, even when they are coded in assembly language. The CPU time made available by the efficiency of this algorithm allows the processor to handle other tasks, thereby allowing a more complex and rich product to be deployed on machines of given processing power. For example, the invention makes more CPU time available to make it easier to implement such features as software picture-within-picture, visually powerful but CPU-intensive Sarnoff video effects, simultaneous view and record, interactive Web access, background Electronic Program Guide (EPG) processing, HDTV video rendering, and software motion compensation.

DETAILED DESCRIPTION OF THE INVENTION

The invention provides an algorithm that is a more efficient technique for solving a well-defined and relatively long-existing problem, i.e. that of locating start codes in an MPEG-2 stream. Any extant algorithm that validly accomplishes this can be viewed as prior art. One purpose of the invention is to reduce the amount of CPU time necessary to accomplish this defined goal. It should be appreciated by those skilled in the art that the invention, while useful for MPEG-2 data streams, is not limited to this standard and may readily be applied to other standards. For example, while the search pattern implemented for the preferred embodiment of the invention is hard-wired to MPEG-2, the general algorithmic concept can be applied to any problem where finding unique 3-byte patterns in a buffer is required. The concept is generally extensible to searches of any pattern length, but is particularly useful when the pattern is an odd number of bytes.

The presently preferred embodiment of the invention is particularly useful when deployed on CPUs having the following capabilities in their instruction sets (although it is not limited to just these types of processors):

The ability to scan an arbitrarily-sized block of memory for a match or mismatch to a given byte/word/double-word value (e.g. the 80×86's SCAS instruction). In the preferred embodiment of the invention, only word scans are needed.

The ability to compare two arbitrarily but equally sized blocks of memory for identicality, indicating whether they are or are not byte-for-byte identical (e.g. the 80×86's CMPS instruction).

The ability to perform both of the above functions as a single macro-instruction (e.g. the 80×86's REPE/REPNE instructions).

The source code for an algorithm which implements a presently preferred embodiment of the invention is set forth in Table A below in a format compatible with the Microsoft C++ compiler manufactured by Microsoft Corporation of Redmond, Wash. A narrative flow chart of the algorithm follows:

0 Entry point. Is "buffer end trimming" enabled (via calling parameter)? If not, go to step 2.
1 See if the end bytes of the buffer match any of the following six patterns:
  00
  00 00
  00 00 01
  If so, reduce the size of the evaluation buffer to remove these bytes. This reduction to the size of the logical buffer must be communicated back to the calling routine, so that these "skipped" bytes are re-evaluated on the subsequent call to the start-code scanner routine. Loop step 1 until test condition is FALSE. It should be noted that in some cases (such as a buffer consisting entirely of zero bytes) that this trimming could wind up consuming the entire buffer; in this special case, the original size of the buffer should be reduced by one or two bytes, depending on whether the last one or two bytes of the buffer are zeros, and return to the caller saying no start codes exist in the buffer. (The actual code used in the source code included below uses a much more efficient, but more difficult to describe, algorithm that has the same net impact. Those skilled in the art will appreciate and understand the operation of either algorithm as set forth herein.) If the size of the buffer, factoring in any initial offset, is less than six bytes, return to the caller saying that no start codes are present in the now size-reduced buffer. Otherwise, if the new size of the buffer is an odd number, decrement it to make it an even number, and reflect this back to the caller, so that this additional "trimmed-off" byte gets re-scanned on the next call.
2 See if first DWORD at the current buffer evaluation position is zero. If not, skip to step 5.
3 Scan forward until the first non-zero WORD is found. This is a WORD scan, as defined in step 5. If the end of the evaluation buffer is reached before a non-zero WORD is found, return to caller (if "buffer end trimming" is enabled, this should not occur).
4 Move evaluation buffer pointer back one WORD, since this "leading" zero WORD may be the beginning of a start-code.
5 Scan forward for the first zero WORD (this is detected immediately, if step 4 was just executed). The scan is a WORD scan (the "search pointer" is advanced one WORD, i.e. two BYTEs, for each iteration). If the end of buffer is reached, flag that no ending zero WORD was found, and go to step 7.
6 Check at this point for the existence of a valid start code. This is based on the following rules:
  The first two BYTES are zero.
  The third BYTE is one.
  If this is an audio channel (as defined by one of the calling parameters to the start-code scanning routine), see if the fourth BYTE lies in the range of 0xC0 through 0xDF, inclusive. If not, this is not a valid start code.
  If this is not an audio channel, check that the fourth BYTE is not in the range of 0xC0 through 0xDF, inclusive. If it Is, this is not a valid start code.
  If the fourth BYTE is zero, check to see if the fifth and sixth bytes are zero. If they both are, this is not a valid start-code.
  If this discovered zero WORD is found to not be a valid start-code, loop back to step 5. Else, store offset of this discovered start-code in a local variable.
7 Define a temporary section of the evaluation buffer, from the point where the scan started at step 5 (but not advanced by any failed start-code tests in step 6) to the point where the start-code was detected in step 6 (or the end of buffer, if we got here from step 5). Call this sub-buffer the zero-word reach. Set the "current position" to the beginning of this zero-word reach.
8 Scan forward, as a WORD scan (see step 5 for definition), bounded inside the zero-word reach, for the next WORD of value 00 01 (this would be expressed as 0x0001 on big-endian machines, or 0x0100 on little-endian machines). If not found, go to step 10.
9 Check to see if this is a valid start-code, using the rules defined in step 6 (but keeping in mind that the pointer is now one BYTE into the potential start-code). If a start-code is found, append its offset into the list to be returned to the caller. In either case, then loop back to step 8.
10 If the process got to step 7 from step 6 (rather than step 5), append the offset of the start code discovered in step 6 into the list to be returned back to the caller, set the "current pointer" to the WORD following the start-code discovered in step 6, and loop back to step 2. Otherwise, return to caller.

EXAMPLE

Assume the offset buffer (the buffer to which the start-code offsets are written) can hold six entries. This example source buffer has 14 start codes (offsets expressed in hex). Byte patterns of 0x00 0x00 and 0x00 0x01 that are not actual start codes may be present; to save on detail, assume that such "false start codes" are detected and skipped over, and that it is possible to verify that each start code actually is a start code.

Figure 1A:
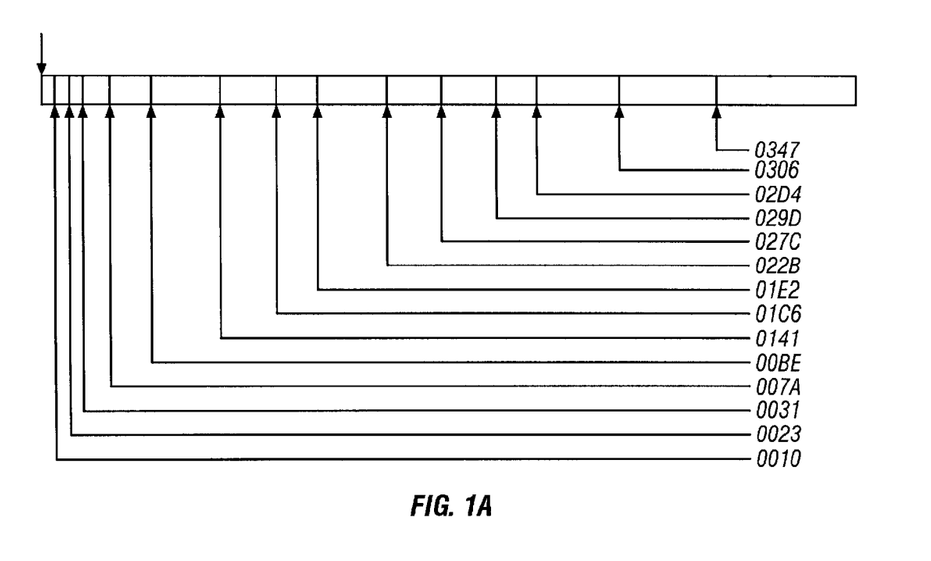
FIGS. 1a to 1m provide an example of a start code scanner according to the invention.

On entry, the buffer pointer is positioned at zero (see FIG. 1a).

Figure 1B:
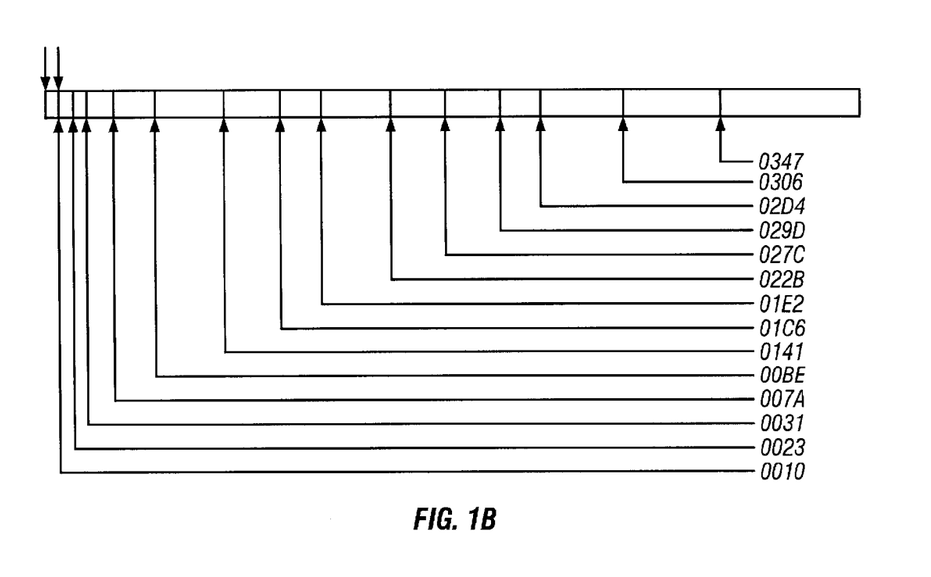

Look for the first aligned 0x00 0x00 word, which is found at 0x0010 (see FIG. 1b).

Figure 1C:
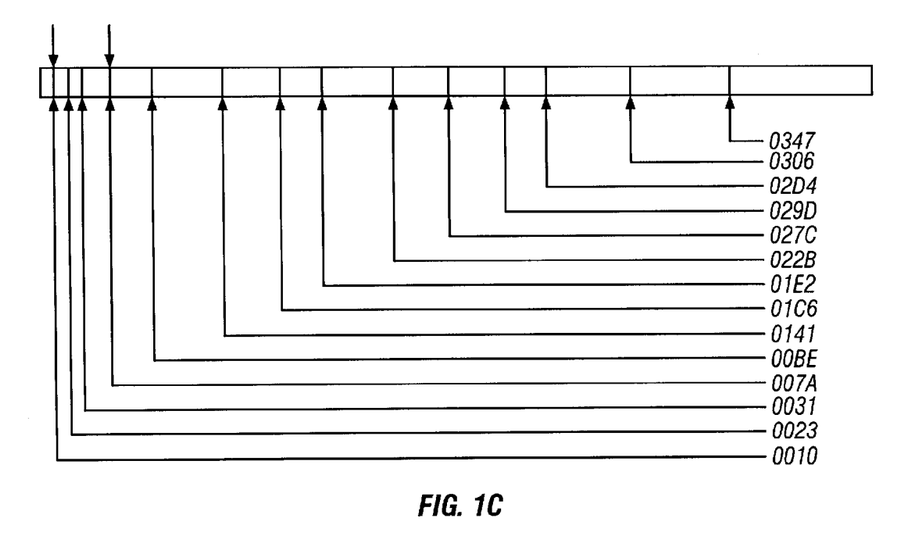

Establish the zero-word reach at 0x0000 to 0x0010 (see FIG. 1c). Look for word-aligned byte pattern of 0x00 0x01 in this reach. There are not any, so the offset 0x0010 is set in the output list, giving it one entry so far. Starting at one word after the previous zero-word reach (i.e. offset 0x0012), look for the next word-aligned byte pattern of 0x00 0x00. This is found at offset 0x007A (note that the difference between 0x0010 and 0x0012 is not shown in FIG. 1c, although in reality the left pointer is moved right by two address locations).

Figure 1D:
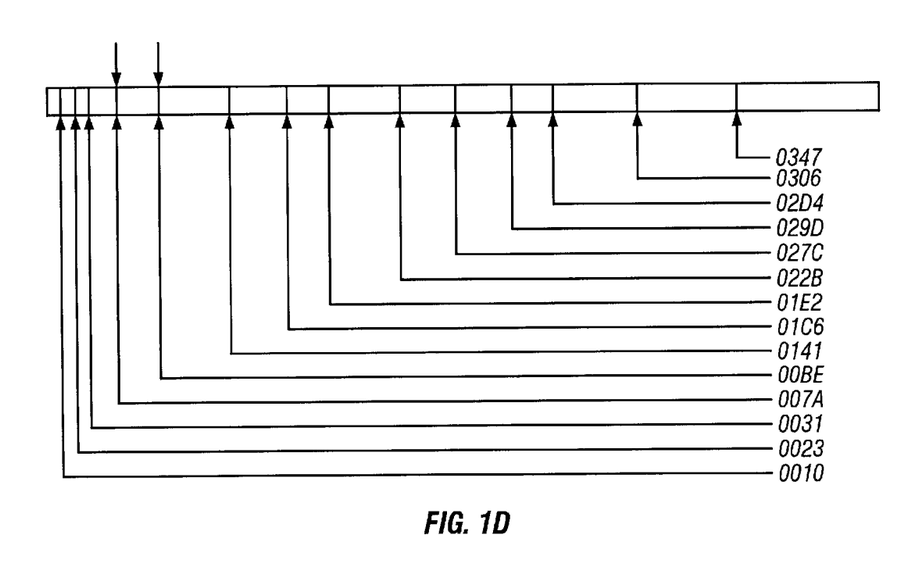

Scan this new zero-word reach for word-aligned byte patterns 0x00 0x01 (see FIG. 1d). Two are found—at 0x0024 and 0x0032. After verifying that 0x0023 and 0x0031 are start codes, add these two offsets into the table (bringing the total to three SQ far), and then add in the offset 0x007A, resulting in four entries in the output table. Next, look for the next word-aligned 0x00 0x00, finding it at 0x00BE.

Figure 1E:
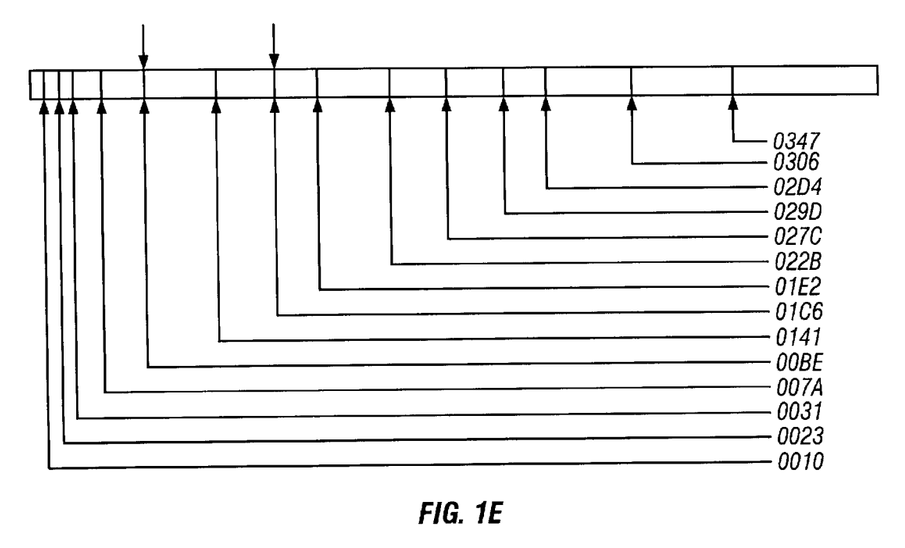

A scan of this zero-word reach reveals no "odd-aligned" start codes, so offset 0x00BE is added to the output table, bringing the number of entries up to five (out of six). The next zero-word reach takes us to offset 0x01C6 (see FIG. 1e).

A scan of the "odd-aligned" start codes finds one at 0x0141 (the 0x00 0x01 pattern found at 0x0142), so add that to the output table, filling it up to six. Because that was the size of the output table, return to the caller indicating that the output table has six entries.

Figure 1F:
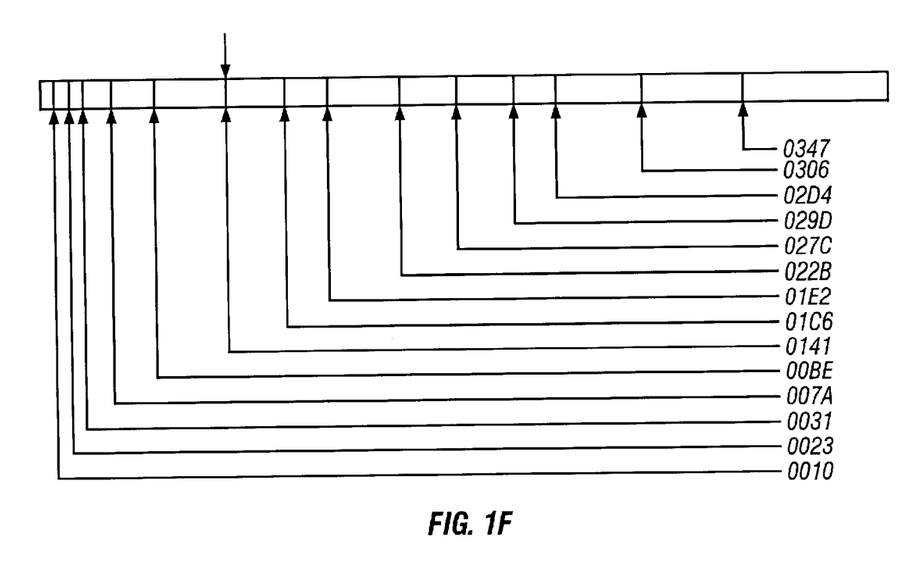

On the next call to the start-code scanner routine, start off with an initial offset of 0x0142 to "skip over" the last-detected start code(see FIG. 1f). The initial offset, if given, must always be an even number; if an odd number is passed in, it is incremented to make it even.

Figure 1G:
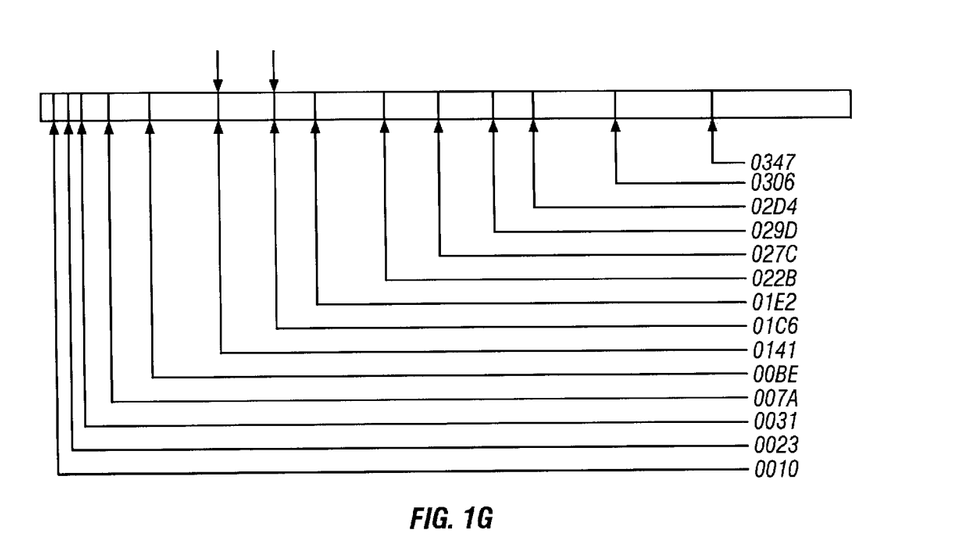

Look for the next word-aligned pattern of 0x00 0x00, again finding it at 0x01C6 (see FIG. 1g).

Figure 1H:
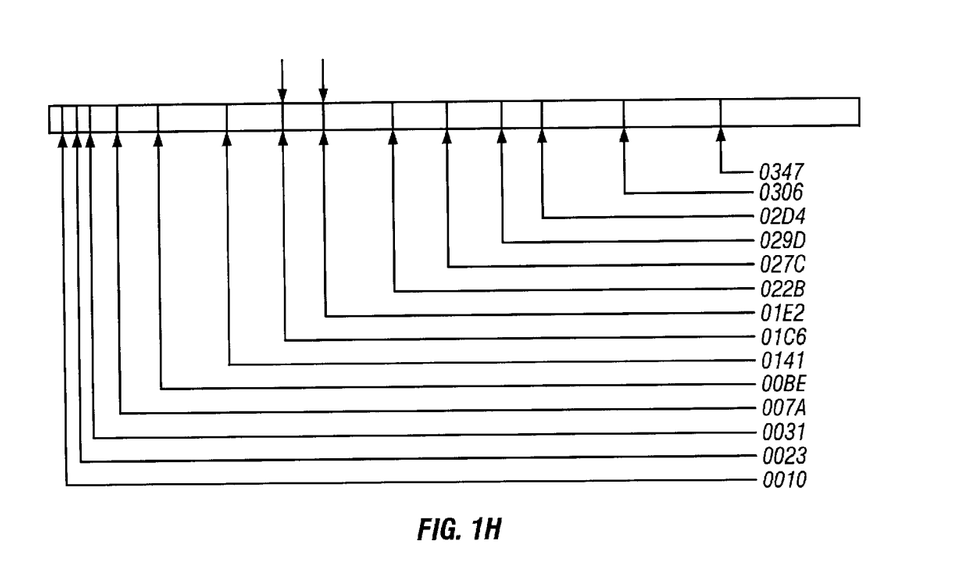

A re-scan of this zero-word reach finds no "odd-aligned" start codes, so the first entry into the output table is 0x01C6 (see FIG. 1h). Looking for the next zero-word reach finds it bounded at 0x01E2.

Figure 1I:
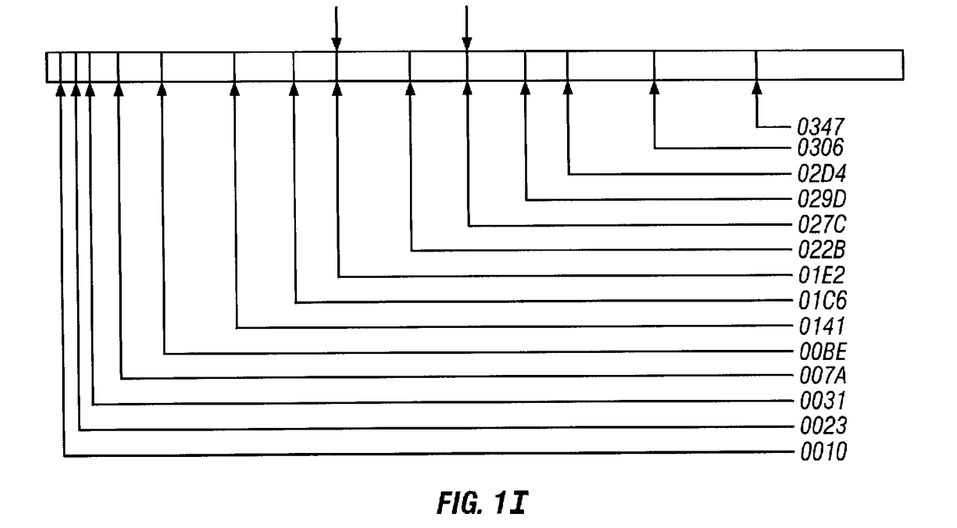

Again, there is no intervening "odd-aligned" start codes, so the second entry into the output table is 0x01E2 (see FIG. 1i). The next zero-word reach goes to offset 0x027C.

Figure 1J:
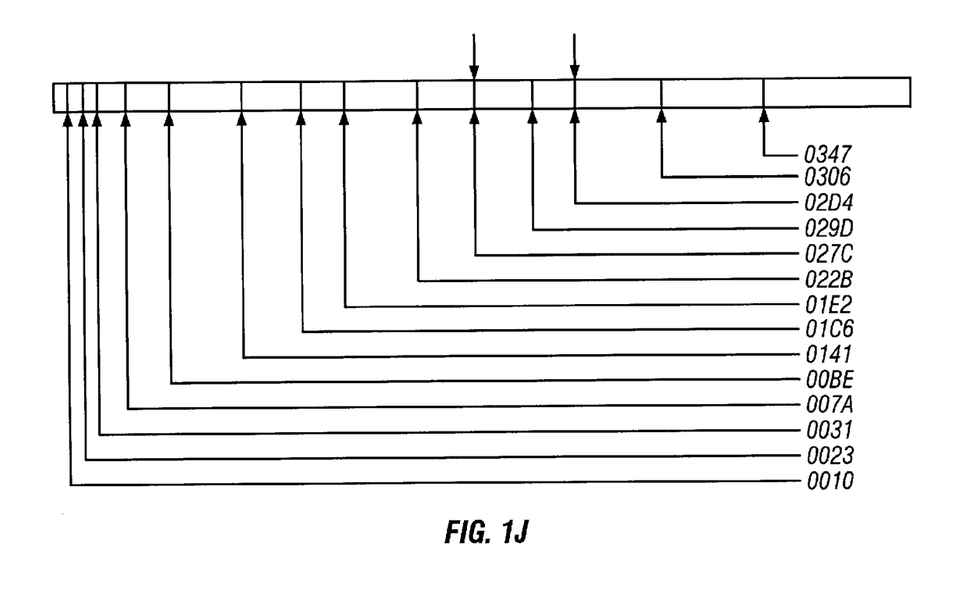

There is one "odd-aligned" start code in this reach, so the third entry in the output table becomes 0x0x022B, and the fourth 0x027C (see FIG. 1j). Another zero-word reach moves the search pointer to 0x02D4.

This zero-word reach has embedded in it a start code at 0x029D (the 0x00 0x01 pattern being detected at 0x029E), so the fifth and sixth entries into the output table are 0x029D and 0x02D4. Because that fills up the table, the process returns to the caller.

Figure 1K:
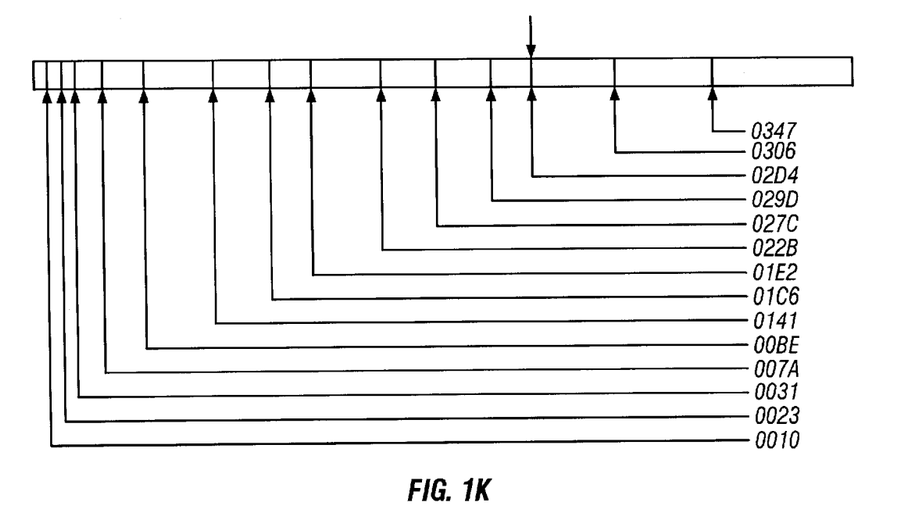

On the third call to the scanner for this buffer, the search is started at offset 0x02D6 (see FIG. 1k).

Figure 1L:
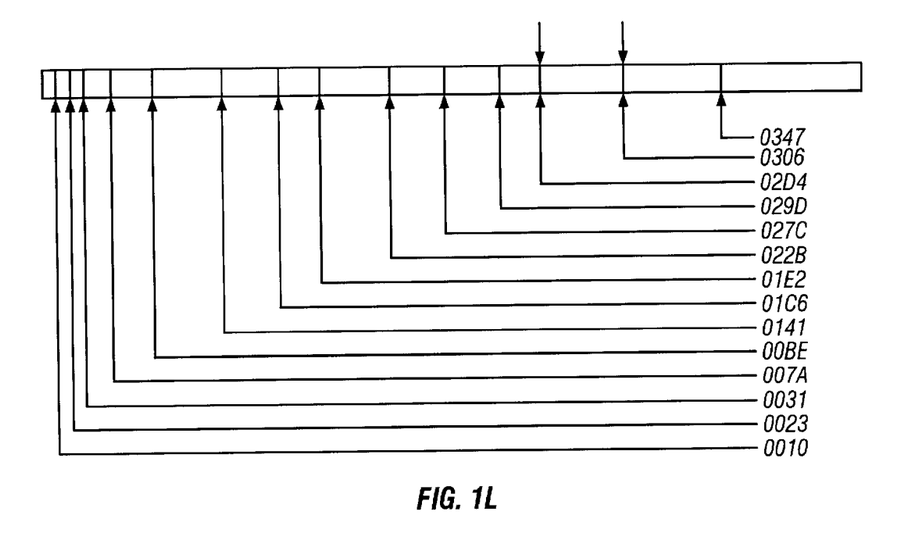

The next word-aligned 0x00 0x00 pattern is discovered at 0x0306 (see FIG. 1l).

A re-scan of this zero-word reach reveals no "odd-aligned" start codes, so the first entry into the output table is 0x0306. The next scan for the 0x00 0x00 pattern is unsuccessful, this fact is flagged and the process moves the "far end" of the now so-called zero-word reach to the end of the buffer (see FIG. 1m).

Figure 1M:
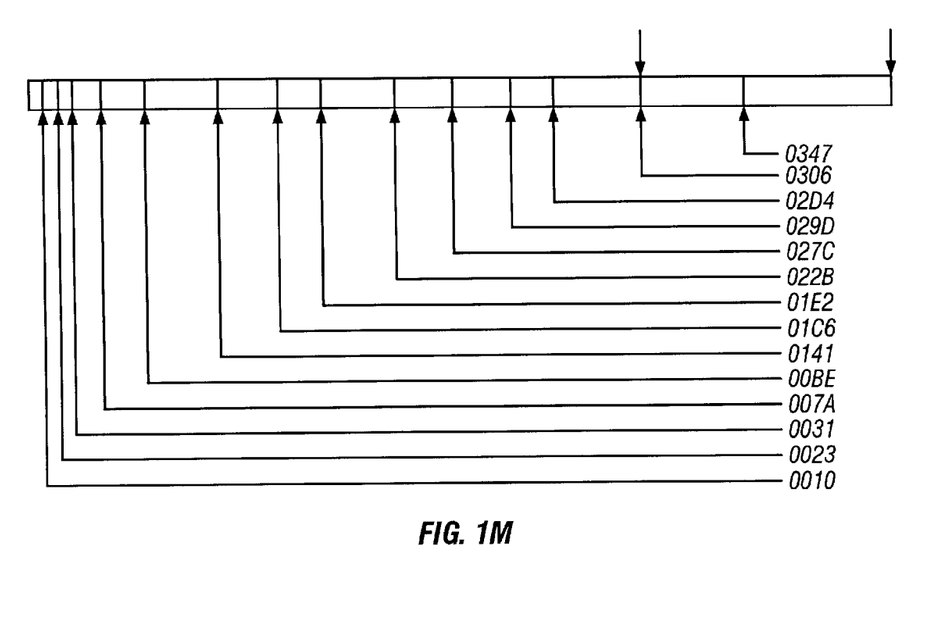

A re-scan of this sub-buffer for word-aligned 0x00 0x01 patterns finds one at 0x0348, so offset 0x0347 is added to the output table, bringing up its membership to two entries. Because this is the end of the buffer, there is nothing more to do, so the process returns to the caller, indicating that two more start-codes were found.

TABLE A

Source Code Listing of an Algorithm for Start Code Scanning In Accordance with the Invention

```
DWORD FindStartCodes(unsigned char *buf, DWORD bufOffset,
    DWORD &length, DWORD *offsetList, DWORD listSize,
    unsigned char isAudio, DWORD noEndBufferTrimming)
{
WORD      savFLAGS;
DWORD     saveESI, saveEDI; // C++ compiler wants these
                            // back
DWORD     bufp = (DWORD) (buf + bufOffset), bufLenAdj;
DWORD     hCnt = listSize;
if(!buf || !bufLen || (*bufLen – bufOffset) < 8 ||
   !offsetList || !listSize || bufOffset >= *bufLen – 6)
{
   assert(0); //sanity checks
   return 0;
}
__asm
{
    // Save things the C++ compiler wants preserved.
    pushf
    pop     word ptr savFLAGS
    mov     savESI,esi
    mov     savEDI,edi
    // See if we're to do buffer end-trimming
    mov     esi,bufLen
    cmp     dword ptr noEndBufferTrimming,0
    jne     skipLimitCheck
    // The way this works is thus: See if the last one
    // or to bytes of the buffer are zero; if so,
    // adjust the effective buffer length to exclude
    // them (they'll get re-scanned on the next scanner
    // call). Then, starting at the END of the buffer,
    // search backwards for the first non-zero byte.
    // If the resultant offset into the buffer where
    // the non-zero bytes was found is less than 2,
    // return to the caller saying there was no start
    // codes in the buffer. Else, if further
    // examination shows that this was a one byte
    // preceded to two zero bytes, reposition the
    // point to before this start code and scan again.
    // Otherwise, adjust the length of the buffer to
    // just include this discovered non-zero byte.
    mov     ebx,buf         // buffer origin
    mov     ecx,[esi]       // get passed-in length
    mov     eax,[ebx+ecx–4] // get last 4 bytes of buffer
    shr     eax,8           // we only care about last 3
    cmp     eax,10000h      // is it a start code prefix?
    jne     zskip0          // no, so go do other tests
    sub     dword ptr [esi],3 // trim it off buffer
    jmp     zskip
zskip0:
    shr     eax,8
    cmp     ah,1            // test very last byte of
                            // buffer
    ja      skipLimitCheck  // if greater than one, the
                            // buffer includes it
    jnb     zskip           // if it's 1, branch
    dec     dword ptr [esi] // else, "swallow" the 0 byte
    cmp     al,1            // same thing for 2nd-to-last
                            // buffer byte
    ja      skipLimitCheck
    jnb     zskip
    dec     dword ptr [esi]
zskip:
    mov     ecx,[esi]       get adjusted buffer len
    sub     ecx,bufOffset   // limit to "scan buffer"
    mov     ebx,bufp
    std                     // reverse searches for this
                            // passage
loop0:
    lea     edi,[ebx+ecx–1] // get end addr of scan buf
    xor     al,al           // search for a zero byte
    repe    scasb
    cmp     ecx,2           // too close to buf origin?
    jb      outtaHere       // if so, exit
    dec     ecx             // adj length to swallow 1st
                            // start prefix byte
```

TABLE A-continued

Source Code Listing of an Algorithm for Start Code Scanning In Accordance with the Invention

```
            mov     eax,[edi-1]     // get potential start code
                                    // into EAX
            and     eax,0FFFFFFh    // see if it's really 00 00 01
            cmp     eax,0010000h
            je      loop0           // it is a start code, so keep
                                    // on scanning
            add     ecx,2           // else, adj buf length
            add     ecx,bufOffset
            mov     [esi],ecx       // and update caller's
                                    // variable
skipLimitCheck:
            cld
            and     byte ptr [esi], 0FEh // leng must be even
                                    // number
            mov     eax,[esi]       // get length of physical
                                    // buffer after trimming
            sub     eax,buf Offset  // get length of evaluation
                                    // buffer
            shr     eax,1           // we scan words not bytes
            mov     bufLenAdj,eax   // init for scanning loops
            mov     esi,offsetList  // point to output list of
                                    // offset
            jmp     loop1a          // jump into the game
        // Now, the way this works is thus: we scan the
        // buffer (or part of buffer, if this isn't the
        // first iteration of the loop) for the first
        // word-align WORD of 0x0000. We then save its
        // offset (or, if we didn't find such a WORD, the
        // offset of the end of the buffer) in a local
        // variable, and re-scan the same subbuffer we
        // just identified for the word-aligned pattern of
        // WORD value 0x0100. For each that we find, we
        // add an entry to the output list. Once we've
        // found all the 0x0100 WORDs in the subbuffer, we
        // then add the offset of the 0x0000 WORD found in
        // the first scan (if we found one) to the output
        // list. Then, starting with the subbuffer
        // following the 0x0000 WORD we just added to the
        // output list, we do it all over again. We keep
        // doing this until the scan for both the 0x0000
        // and 0x0100 pattern ends at the end of buffer.
        // This results in an ordered list of offsets in
        // the output buffer, without a lot of code
        // execution time to get it.
loop1:
            inc     ebx             // do we have an offset to a
                                    // 0x0000 WORD?
            jz      loop1a          nope, so skip the list add
            lea     eax,[ebx-1]     // get addr of 0x0000 WORD
            sub     eax,buf         // subtract buffer org to get
                                    // offset
            add     eax,eax         // shift it left one bit
            xchg    esi,edi
            mov     dl,[ebx+2]      // get the start code
            xor     dl,0C0h         // see if it's within 0xC0 through
                                    //0xEF
            cmp     dl,030h         // set carry if so
            rcr     eax,1           // put in high-bit of offset
            stosd                   // put in output list
            xchg    esi,edi
            dec     dword ptr hCnt  // see if we've filled output
                                    // list
            jz      exitRoutine     // if so, we're done
        // Initial entry point here.
loop1a:
            mov     ecx,bufLenAdj   // restore ECX and EDI from
                                    //previous iteration
            mov     edi,bufp
            xor     eax,eax         // we're looking for 0x0000
                                    // patterns
            lea     ebx,[eax-1]     // init EBX to no discovered
                                    // 0x0000 WORD
loop1b:
            or      ecx,ecx         // at end of buffer?
            jz      exitRoutine
        // Bob W. pointed out that some MPEG versions used
        // zeros for stuffing bytes. Since we don't want
        // to examine these, we look first to see if the
        // next FOUR bytes are all zeros. If so, we assume
        // they're stuffing bytes, and swallow all the
        // following 0x0000 WORDs. Once we found the next
        // non-zero WORD, we back up to bytes (since they
        // could be the first two bytes of a start
        // prefix), and continue down our merry way.
            cmp     eax,[edi]       zero DWORD?
            jne     loop1c          // nope, so skip this
            repe    scasw           // swallow all following zero
                                    // WORDs
            je      loop2           // end of buffer; look for
                                    // remaining 0x0100 WORDs
            inc     ecx
            inc     ecx
            sub     edi,4
loop1c:
            repne   scasw           // look for next 0x0000 WORD
            jne     loop2           // none found, look for any
                                    // remaining 0x0100 WORDs
            mov     edx,[edi]       // get start code and preceding
                                    // and following byte
            cmp     dl,1            byte following 0x0000 must be
                                    // 0x01 to be start prefix
            jne     loop1b          // if it isn't, skip
        // As Bob W. and I discussed, a start code of zero
        // followed by a zero word cannot be a "real"
        // start code, so we skip it.
            shr     edx,8
            or      edx,edx         // look for 3 zero bytes
            jz      loop1b          // if found, skip
        // In audio, we only look for 0xC0 through 0xDF
        // start codes
            cmp     byte ptr isAudio,0
            je      loop1d
            xor     dl,0C0h
            cmp     dl,020h
            jae     loop1b          // not an audio start code
loop1d:
            lea     ebx,[edi-2]     // remember the offset of this
                                    // 0x0000 WORD
        // Now we're going to search this same subbuffer
        // for any 0x0100 patterns.
loop2:
            mov     bufLenAdj,ecx   // save this for next 0x0000
                                    // search
            mov     ecx,edi         // compute length of this
                                    // subbuffer
            xchg    edi,bufp
            sub     ecx,edi
            shr     ecx,1           // WORD not BYTE search
            dec     ecx             // Move to the 2nd WORD in the
                                    // subbuffer
            inc     edi
            inc     edi
loop2a:
            or      ecx,ecx
            jz      loop1           // end of input buffer; clean up
                                    // and exit
            mov     eax,100h        // pattern to search for
            repne   scasw           // do the search
            jne     loop1           none found - go look for next
                                    // 0x0000 pattern
            mov     edx,[edi-3]     // load complete start code
            rol     edx,8           move start code token to DL,
                                    // 1st byte of prefix
            or      dh,dh           // to DH - if not zero, not a
                                    // start code
            jnz     loop2a          // no start code, skip
        // Again, 3 zero bytes following 0x00 0x00 0x01 is
        // not a valid start code.
            test    dwordc ptr [edi],0FFFFFFh
            je      loop2a          // in this case, we don't
                                    // acknowledge it
            cmp     byte ptr isAudio,0
```

TABLE A-continued

Source Code Listing of an Algorithm for Start Code Scanning In
Accordance with the Invention

```
         je        loop2b
         xor       dl,0C0h
         cmp       dl,020h
         jae       loop2a       // not an audio start code
         xor       dl,0C0h
loop2b:
         lea       eax,[edi-3]  // get offset of start prefix
         sub       eax,buf      // convert to buffer offset
         add       eax,eax      // do the high bit set on PES
                                // header trick
         xchg      esi,edi
         xor       dl,0C0h
         cmp       dl,030h
         rcr       eax,1
         stosd
         xchg      esi,edi
         dec       hCnt         // output buffer full?
         jnz       loop2a       // if not, go for it again
exitRoutine:
         move      esi,savESI   // restore registers C++ compiler
                                // wants back
         mov       edi,savEDI
         push      word ptr savFLAGS
         popf
}
return(listSize − hCnt); // return number start codes
                        // found
}
```

The presently preferred embodiment of the invention is optimized for the 80×86/Pentium architecture. Those skilled in the art will appreciate that the invention may be used with other architectures. The preferred embodiment of the invention locates the start codes in a buffer of memory at very high speed by using a combination of string instructions and other features of the Intel processor's architecture, the processor's 32-bit instruction set, and available addressing modes.

Because the invention uses features built into the hosting processor's architecture that allow for fast buffer operations, the algorithm is capable of locating start codes in a memory buffer at very high speeds. Those skilled in the art will appreciate that various known hardware and/or software technique may also be used to perform such operations.

As a benchmark example of the performance achieved using the invention, a 20 megabyte capture of a MPEG-2 stream was processed. Using the invention, a text file describing more than twenty-thousand start codes was written in less than one second on a 266 MHz Pentium machine running Windows NT 4.0. This run time was achieved on second and subsequent runs when the 20 megabyte MPEG-2 file was already loaded into the disk cache. In its first actual application, the invention reduced total CPU use by approximately 60%. Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. A method for start code scanning in a data stream, comprising the steps of:
   scanning an input buffer in a word-wise fashion to identify a word boundary;
   scanning said input buffer to identify a first start code;
   setting a zero word reach having an extent to said first start code from a start point of a present scan;
   storing an offset to said first start code;
   scanning within said zero word reach to identify additional start codes therein;
   storing offsets for said additional start codes with said first start code in sequence;
   defining a next zero word reach if said first zero word reach is a subset of said input buffer; and
   continuing until all start codes within said input buffer are identified and offsets therefor are stored in sequence.

2. A method for locating start-codes in a data stream, comprising the steps of:
   setting a start pointer in a processing buffer;
   in a loop, executing the following steps until said processing buffer has been fully consumed:
      locating a first non-zero word if the first n bytes pointed at by said start pointer are all zeros;
      returning to a caller if the end of said buffer is reached;
      otherwise, setting said start-pointer to one less word than said non-zero word that terminated a zero-word scan;
      scanning to find a first word-aligned zero word;
      checking that the byte following the zero word is a one, that the byte following the one byte is a legal start code, and that the three bytes consisting of the start code and the following two bytes are not all zeros;
      skipping said first zero word if the bytes following it do not meet criteria for a legal start code, and looking for a next zero word, unless at the end of said processing buffer;
      if a start-code is discovered, or there is a scan to the end of said processing buffer, identifying a section of said processing buffer from said start-pointer to the location of a zero-word scan termination that was determined in fact to be a legal start code, or the end of said processing buffer, as the zero-word reach;
      rescanning said zero-word reach starting with a second word of said zero word reach for a pattern of 0×00 0×01;
      for each occurrence of said pattern indicative of a start code found in said zero-word reach, determining that a preceding byte was a zero-byte, that a following byte is legal for said channel type, and that the three bytes following the discovered 0×00 0×01 pattern are not all zeros;
      for each start code, adding an entry to a passed-in list of start-code off sets;
      wherein an ordered list of all the start codes in said processing buffer is generated, up to a limit of an offset array.

3. The method of claim 2, further comprising the steps of:
   determining if a current zero-word reach extends to the end of said processing buffer when all (if any) of aligned words of 0×00 0×01 in said zero-word reach have been processed;
   if so, returning to caller;
   otherwise, adding an offset of said pattern indicative of a start code defining the end of said current zero-word reach to said list of start-code offsets;
   setting said start-pointer to the word following a zero-word of said current zero-word reach; and
   performing a next iteration.

4. The method of claim 2, wherein said process can be repeated for said processing buffer by setting a processing buffer offset to be a word following a last discovered start-code offset if it is possible that there are more start codes in said processing buffer than there were members in said offset array.

5. The method of claim 2 wherein, when invoked, said method is passed a pointer to said processing buffer, an optional offset into said processing buffer representing the start of a sub-buffer that is actually to be processed, the length of said processing buffer, a pointer to a start-code array where the offset(s) into said processing buffer of all discovered start-code(s) are stored, the number of elements in said start-code array, a flag indicating if said data stream is an audio or video channel, and a flag indicating if buffer end-trimming should be implemented.

6. The method of claim 2, further comprising the steps of:
 buffer end trimming, comprising:
  looking for a longest of an array of specific byte patterns at the end of said processing buffer; and
   reducing the length of said processing buffer to exclude bytes of said specific byte pattern at the end if any of these patterns are found.

7. The method of claim 6, further comprising the steps of:
 determining if the size of the buffer, augmented by the initial offset, if any, after buffer end-trimming is less than six bytes; and
 if so, returning to caller stating that no start codes are present in the now size-reduced buffer.

8. The method of claim 6, wherein said byte patterns comprise:
 0x00;
 0x00 0x00;
 0x00 0x00 0x01.

9. The method of claim 2, wherein said data stream is an MPEG-2 stream.

10. A method for locating start codes in a data stream, comprising the steps of:
 performing a word-wise scan of a processing buffer to identify a first start code;
 storing an offset value for said first start code;
 setting a zero word reach based on said first start code offset;
 scanning within said zero word reach to identify additional start codes; and
 storing offset values for said additional start codes with said first start code in sequence.

11. The method of claim 10, further comprising the step of:
 setting additional zero word reaches starting at an end of said first zero word reach; and
 identifying and storing start codes within each said additional zero word reach until said processing buffer is consumed.

12. An apparatus for start code scanning in a data stream, comprising:
 an input buffer;
 a scanner for scanning said input buffer in a word-wise fashion to identify a word boundary; said scanner scanning said input buffer to identify a first start code;
 means for setting a first zero word reach having an extent to said first start code from the start point of a current scan;
 a cache for storing an offset to said first start code;
 wherein said scanner scans within said zero word reach to identify additional start codes therein;
 wherein said cache stores offsets for said additional start codes with said first start code in sequence; and means for defining a next zero word reach if said first word reach is a subset of said input buffer;
wherein said apparatus continues until all start codes within said input buffer are identified and offsets therefor are stored in said cache in sequence.

13. An apparatus for locating start-codes in a data stream, comprising:
 a processing buffer;
 a start pointer in said processing buffer;
 a processor for executing the following steps until said processing buffer has been fully consumed:
  locating a first non-zero word if the first n bytes pointed at by said start pointer are all zeros;
  returning to the caller if the end of said buffer is reached;
  otherwise, setting said start-pointer to one less word than said non-zero word that terminated a zero-word scan;
 a scanner for scanning to find a first word-aligned zero word;
 wherein if said first zero word is found, said scanner insures that a following byte is a byte of value one, that a byte following said one byte is legal for a type of channel being processed, and that the three bytes following said one byte are not all zeros;
 wherein if said first zero word is not found, said scanner looks for a next zero word, unless at the end of said processing buffer; and
 wherein if a start-code is discovered, or there is a scan to the end of said processing buffer, said scanner identifies a section of said processing buffer from said start-pointer to a location of a the discovered start code, or the end of said processing buffer, as the zero-word reach;
 said scanner rescanning said zero-word reach starting with a second word of said zero-word reach for a word aligned pattern of 0x00 0x01, which is indicative of a start code;
 means for determining that a preceding byte was a zero-byte, and that a following byte is legal for said channel type for each occurrence of said pattern indicative of a start code found in said zero-word reach, and that the three bytes following the discovered 0x00 0x01 word are not all zeros;
 means for adding an entry to a passed-in list of start-code offsets for each start code;
 wherein an ordered list of all the start codes in said processing buffer is generated, up to a limit of an offset array.

14. The apparatus of claim 13, further comprising:
 means for determining if a current zero-word reach extends to the end of said processing buffer when all (if any) of said patterns indicative of a start code in said zero-word reach have been processed;
 if so, returning to the caller;
 otherwise, adding an offset of said pattern indicative of a start code defining the end of said current zero-word reach to said list of start-code offsets;
 means for setting the start-pointer to the word following a zero-word of said current zero-word reach; and
 means for performing a next iteration.

15. The apparatus of claim 13, further comprising:
 means for setting a processing buffer offset to be the word following a last discovered start-code offset if there is the possibility that there are more start codes in said processing buffer than there were members in said offset array.

16. The apparatus of claim 13, wherein any of the following are passed to said apparatus when operation thereof begins:
   a pointer to said processing buffer;
   an optional offset into said processing buffer representing the start of a sub-buffer that is actually to be processed;
   the length of said processing buffer;
   a pointer to a start-code array where the offset(s) into said processing buffer of all discovered start-code(s) are stored;
   the number of elements in said start-code array;
   a flag indicating if said data stream is an audio or video channel; and
   a flag indicating if buffer end-trimming should be implemented.

17. The apparatus of claim 13, further comprising:
   a module for buffer end trimming, comprising:
      means for looking for a longest of an array of specific byte patterns at the end of said processing buffer; and
      means for reducing the length of said processing buffer to exclude bytes of said specific byte pattern at the end if any of these patterns are found.

18. The apparatus of claim 17, further comprising:
   means for continuing until none of said specific byte patterns match the end of said processing buffer;
   means for determining if the resultant length of the processing buffer, factoring in any initial offset, is less than six bytes, in which case the scanner terminates and returns to the caller, indicating the no start codes were detected in the buffer; and
   means for decrementing said processing buffer length so that it is an even number if a resultant length is an odd number.

19. The apparatus of claim 17, wherein said byte patterns comprise:
   0x00;
   0x00 0x00;
   0x00 0x00 0 x01.

20. The apparatus of claim 13, wherein said data stream is an MPEG-2 stream.

21. An apparatus for locating start codes in a data stream, comprising:
   a processor for performing a word-wise scan of a processing buffer to identify a first start code; and
   a cache for storing an offset value for said first start code;
   wherein said processor sets a first zero word reach based on said first start code offset;
   wherein said processor scans within said first zero word reach to identify additional start codes; and
   wherein said cache stores offset values for said additional start codes with said first start code in sequence.

22. The apparatus of claim 21, wherein said processor sets additional zero word reaches starting at an end of said first word reach; and
   wherein said processor identifies and stores start codes within each said additional word reach until said processing buffer is consumed.

* * * * *